US009292697B2

(12) United States Patent
Dougharty et al.

(10) Patent No.: US 9,292,697 B2
(45) Date of Patent: Mar. 22, 2016

(54) MATRIX CODE FOR ENCRYPTION, STORAGE, AND TRANSMISSION OF DATA

(71) Applicant: International Business Machines Corporation, Armonk, NY (US)

(72) Inventors: Tong C. Dougharty, Southlake, TX (US); Charlet N. Givens, Dallas, TX (US); Janki Y. Vora, Dallas, TX (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 14/059,584

(22) Filed: Oct. 22, 2013

(65) Prior Publication Data

US 2014/0093070 A1 Apr. 3, 2014

Related U.S. Application Data

(63) Continuation of application No. 13/631,912, filed on Sep. 29, 2012.

(51) Int. Cl.
| H04L 29/06 | (2006.01) |
| G06F 21/60 | (2013.01) |
| H04L 9/28 | (2006.01) |
| G09C 5/00 | (2006.01) |
| G06F 21/62 | (2013.01) |

(52) U.S. Cl.
CPC .......... *G06F 21/602* (2013.01); *G06F 21/6218* (2013.01); *G09C 5/00* (2013.01); *H04L 9/28* (2013.01); *G06F 2221/2107* (2013.01); *H04L 2209/56* (2013.01)

(58) Field of Classification Search
None
See application file for complete search history.

(56) References Cited

U.S. PATENT DOCUMENTS

| 5,726,435 | A | 3/1998 | Hara et al. |
| 5,815,577 | A | 9/1998 | Clark |
| 7,751,629 | B2 | 7/2010 | Cheong et al. |
| 8,171,567 | B1 | 5/2012 | Fraser et al. |
| 2004/0012569 | A1* | 1/2004 | Hara ............... G06K 1/121 345/169 |
| 2004/0065739 | A1 | 4/2004 | Xu et al. |
| 2007/0115499 | A1 | 5/2007 | Kimura |
| 2007/0220597 | A1* | 9/2007 | Ishida ............... G06Q 20/12 726/8 |
| 2008/0130896 | A1 | 6/2008 | Wernet et al. |
| 2015/0194008 | A1* | 7/2015 | Kolios ............... G07F 17/329 463/17 |

OTHER PUBLICATIONS

Disclosed Anonymously; "Enhanced Securing of Electronic Labels via Psudo-Random Graphical Data Encryption"; IP.com Prior Art Database; IPCOM000196930D; Electronic Publication: Jun. 21, 2010; <http://www.priorartdatabase.com/IPCOM/000196930>.

(Continued)

*Primary Examiner* — Jeffery Williams
(74) *Attorney, Agent, or Firm* — David Quinn; Fusheng Xu (57) ABSTRACT

A computing device utilizes matrix codes to securely communicate information with a variety of servers. The computing device receives public user data, and generates a display of a base matrix code for reading by a scanner associated with a first server, wherein the base matrix code includes the public user data in a first mask. Responsive to the display of the base matrix code to the scanner associated with the first server, the computing device receives first private user data from the first server. The computing device generates a display of a first combined matrix code for reading by a scanner associated with a second server, wherein the first combined matrix code includes the public user data in the first mask and includes the first private user data in a second mask. The computing device can receive the public and first private user data in a matrix code.

20 Claims, 5 Drawing Sheets

(56) References Cited

OTHER PUBLICATIONS

Chance, M; "A Network-Variational Basis for Generalized Computer Representation of Multifreedom, Constrained, Mechanical Systems"; IP.com Prior Art Database; IPCOM000128410D; Original Publication: May 1, 1969; Electronic Publication: Sep. 15, 2005; <http://www.ip.com/pubview/IPCOM000128410D>.

U.S. Appl. No. 13/631,912, filed Sep. 29, 2012 entitled "Matrix Code for Encryption, Storage, and Transmission of Data".

* cited by examiner

MATRIX CODE FOR ENCRYPTION, STORAGE, AND TRANSMISSION OF DATA

CROSS REFERENCE TO RELATED APPLICATION

This application is a continuation of U.S. patent application Ser. No. 13/631,912 filed Sep. 29, 2012 the entire content and disclosure of which is incorporated herein by reference.

FIELD OF THE INVENTION

The present invention relates generally to matrix codes, and more particularly to using matrix codes for the encryption, storage, and transmission of data.

BACKGROUND

Graphical patterns may be used to convey information. A pattern may be printed or otherwise affixed to an item such as a document or an article of manufacture, for example. The pattern can then be used for various control and monitoring functions by using equipment to read the pattern. One such pattern is a barcode, and common barcodes include one-dimensional barcodes, meaning the barcode pattern varies in only one direction (e.g., the horizontal direction) and are fixed or constant in other dimensions (e.g., the vertical dimension). One-dimensional barcodes are used in applications that do not require a great deal of information to be conveyed by the barcode. An example of such low-information applications is bar coding of food, clothing, and other products sold at retail. One-dimensional barcodes are rendered by machines, and are read by machines. The (typically) alternating thicker and thinner vertical bars that comprise the one-dimensional barcode are generally not susceptible to interpretation by a human.

Two-dimensional barcodes, sometimes called matrix codes, are known that can be used to provide more information than one-dimensional barcodes. Two-dimensional barcodes use patterns that vary in both the horizontal and vertical directions. An exemplary two-dimensional "QR (quick-response) code" barcode system is described in U.S. Pat. No. 5,726,435. This system uses cells in a two-dimensional matrix with positioning symbols that allow the QR code to be read in multiple orientations.

Matrix codes such as the QR code, the Data Matrix, Shotcode, mCode and others serve a variety of purposes. For example, a product may be labeled with a matrix code enabling a customer bearing a smartphone to read the code using the phone, and thereby to retrieve networked information concerning the product and related information. Matrix codes storing addresses and URLs may appear in magazines, on signs, buses, business cards, or other objects about which users might need information. Users possessing a smart phone equipped with a camera and with the correct software can scan the image of the code in order to display text, contact information, connect to a wireless network, open a web page in the phone's browser, or perform a variety of other tasks depending on the data embedded in the matrix code. Matrix codes can be used to display text to the user, to add a vCard contact to the user's device, to open a URI, or to compose a text message or email. Users can also generate and print their own matrix codes for others to scan and use by visiting one of several free matrix code generating websites. However, such user-generated matrix codes, as well as commercially or institutionally generated matrix codes, still suffer from several drawbacks. For example, it is difficult to ensure the security of information communicated with matrix codes.

SUMMARY

Embodiments of the present invention provide for a program product, system, and method to utilize matrix codes to securely communicate information with a variety of servers. A computing device receives public user data, and generates a display of a base matrix code for reading by a scanner associated with a first server, wherein the base matrix code includes the public user data in a first mask. Responsive to the display of the base matrix code to the scanner associated with the first server, the computing device receives first private user data from the first server. The computing device generates a display of a first combined matrix code for reading by a scanner associated with a second server, wherein the first combined matrix code includes the public user data in the first mask and includes the first private user data in a second mask. The computing device can receive the public and first private user data in a matrix code.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
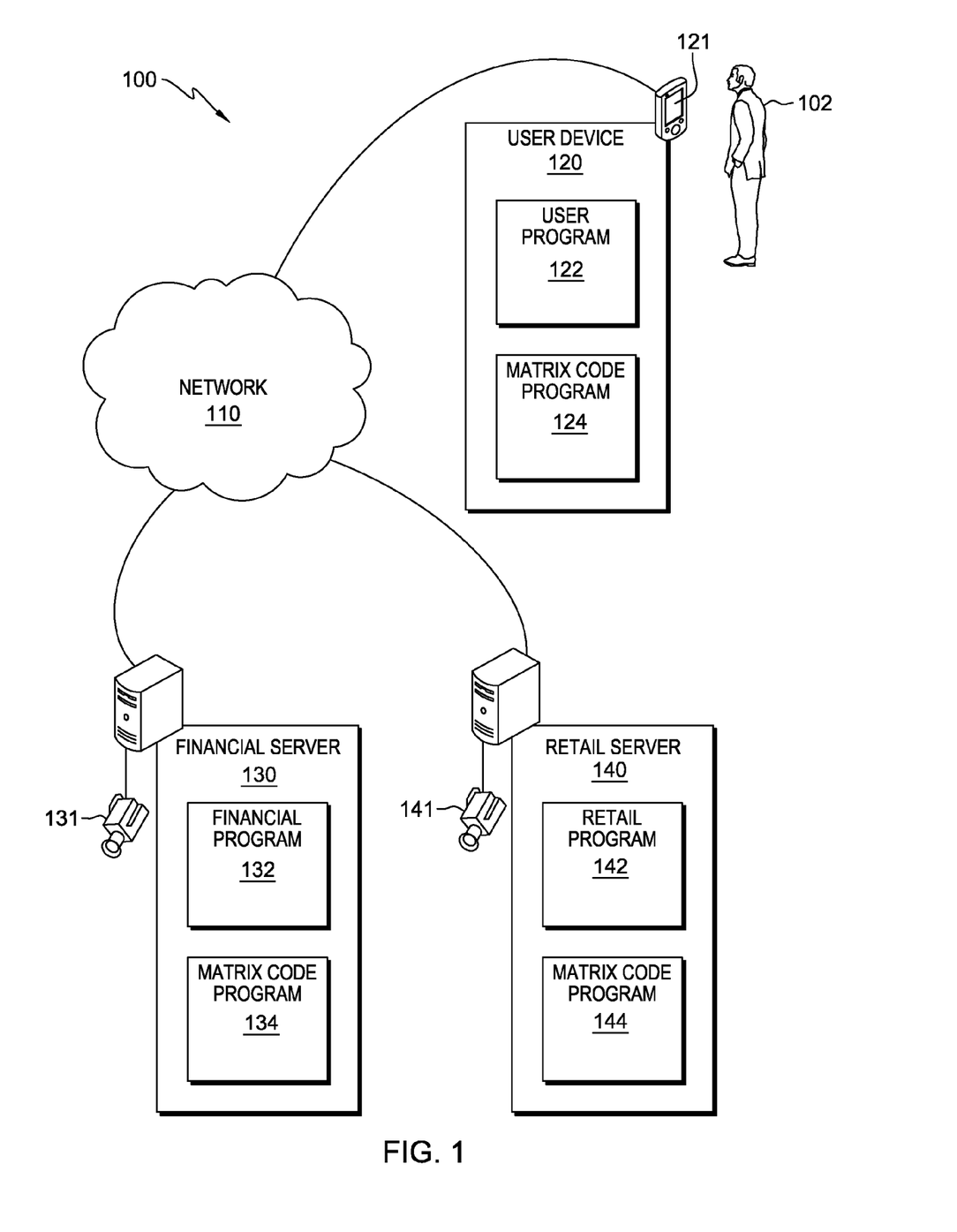
FIG. 1 depicts a communication environment utilizing matrix codes for encryption, storage, and transmission of data in accordance with an embodiment of the present invention.

Referring now to FIG. 1, communication environment 100 utilizing matrix codes for encryption, storage, and transmission of data in accordance with an embodiment of the present invention is shown. Communication environment 100 includes network 110, user device 120, financial server 130, and retail server 140. Network 110 can be, for example, a local area network (LAN), a wide area network (WAN) such as the Internet, or a combination of the two, and can include wired or wireless connections. In general, network 110 can be any combination of connections and protocols that will support communications via various channels between user device 120, financial server 130, and retail server 140 in accordance with an embodiment of the invention. Person 102 can use communication environment 100 to utilize matrix codes for encryption, storage, and transmission of data in various circumstances. Below, an example circumstance will be described in which person 102 stores personal data and financial data on user device 120, and utilizes user device 120 in the context of a retail transaction. However, it should be understood that the techniques introduced herein can be used in a wide variety of additional circumstances. For example, the current technique is not limited to use by electronic devices, and may be utilized as well with physical printouts on paper, for example. Further, the current technique may be used by individuals or by other entities such as a corporation when identifying and tracking shipping containers, for example. Further still, the current technique may be used to communicate additional types of information in addition to personal data and financial data, such as medical data, healthcare data, health insurance data, property insurance data, customer data, and other kinds of data.

In various embodiments, each one of user device 120, financial server 130, and retail server 140 can include a laptop, tablet, or netbook personal computer (PC), a desktop computer, a personal digital assistant (PDA), a smart phone, a mainframe computer, or a networked server computer. Further, financial server 130 and retail server 140 can be computing systems utilizing clustered computers and components to act as single pools of seamless resources when accessed through network 110, or can represent one or more cloud computing datacenters. Further still, financial server 130 and retail server 140 can, in various embodiments, perform other functions, such as medical server functions, healthcare server functions, heath insurance server functions, property insurance server functions, or customer server functions. In general, each one of user device 120, financial server 130, and retail server 140 can be any programmable electronic device as described in further detail with respect to FIG. 4.

As depicted in FIG. 1, financial server 130 and retail server 140 are coupled, respectively, to matrix code scanner 131 and matrix code scanner 141. Matrix code scanners 131 and 141 are configured to scan matrix codes and provide information resulting from the scans to their respective servers. As further depicted in FIG. 1, user device 120 includes display 121. Display 121 is configured to display matrix codes, and additionally to also display a smart phone graphical user interface, a mobile application graphical user interface, or another user interface suitable for use by user 102. The matrix codes displayed on display 121 can be scanned by matrix code scanners 131 and 141. As such, there are at least two channels of communication between user device 120 and financial server 130, in that they can communicate primarily via matrix codes and via network 110 as necessary. There are at least two similar channels of communication between user device 120 and retail server 140. In the example circumstance discussed herein, financial server 130 supports the operation of a bank, and matrix code scanner 131 is located in the premises of the bank. Retail server 140 supports the operation of a retail establishment, and matrix code scanner 141 is located in the premises of the retail establishment.

User device 120 includes user program 122 and matrix code program 124. User program 122 can retrieve, store, and process a wide variety of user data including, for example, public user data such as contact information (e.g., name, phone number, home address, etc.) that can be used in multiple records such as school records, health records, or bank records, or insurance records. The user data can also include private user data including, but not limited to, for example, school grades, health exam results, or bank account numbers, or insurance policy numbers. Further, user program 122 can utilize matrix code program 124 to display some or all of the public and private user data on display 121 in the form of a matrix code. Further still, user program 122 can utilize a mask technique and a distortion technique of matrix code program 124 to manipulate displayed user data on display 121 as discussed in detail below. In another embodiment, user device 120 can print a matrix code to produce a paper copy or another form of hard copy. In such an embodiment, the matrix code printed by user device 120 can be displayed and utilized by person 102 in the same manner as a matrix code displayed on display 121.

Financial server 130 includes financial program 132 and matrix code program 134. Financial program 132 can receive user data from user device 120 from network 110 and, by utilizing matrix code program 134, from matrix codes displayed on display 121 visible to matrix code scanner 131. Further, financial program 132 can utilize a mask technique and a distortion technique of matrix code program 134 to interpret displayed user data on display 121, and further to generate new masks and distortions to encode private user data, as discussed in detail below.

Retail server 140 includes retail program 142 and matrix code program 144. Retail program 142 can receive user data from user device 120 from network 110 and, by utilizing matrix code program 144, from matrix codes displayed on display 121 visible to matrix code scanner 141. Further, retail program 142 can utilize a mask technique and a distortion technique of matrix code program 144 to interpret displayed user data on display 121, as discussed in detail below.

Figure 2A:
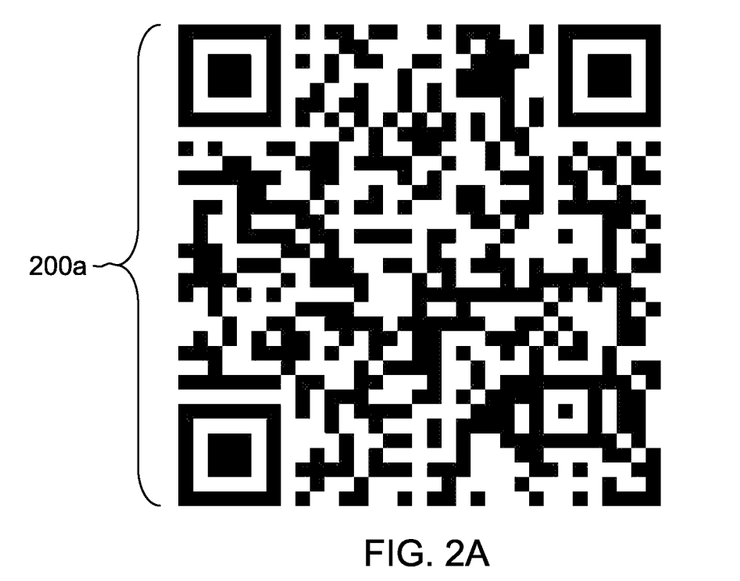
FIG. 2A depicts a matrix code in accordance with an embodiment of the present invention.

Referring now to FIG. 2A, matrix code 200a in accordance with an embodiment of the present invention is shown. In the depicted embodiment, matrix code 200a is formatted as a QR (quick-response) code. However, in other embodiments, matrix code 200a could be formatted as a Data Matrix, Shotcode, mCode, or other two-dimensional code. Further still, in yet other embodiments, matrix code 200a could be formatted with a different dimensionality. Matrix code 200a can be displayed on display 121 of user device 120, and can be scanned by matrix code scanners 131 and 141. As depicted in FIG. 2A, matrix code 200a depicts an example test pattern. In the discussion below, details for generating additional matrix codes including public and private user data utilizing mask techniques and distortion techniques will be explained.

Figure 2B:
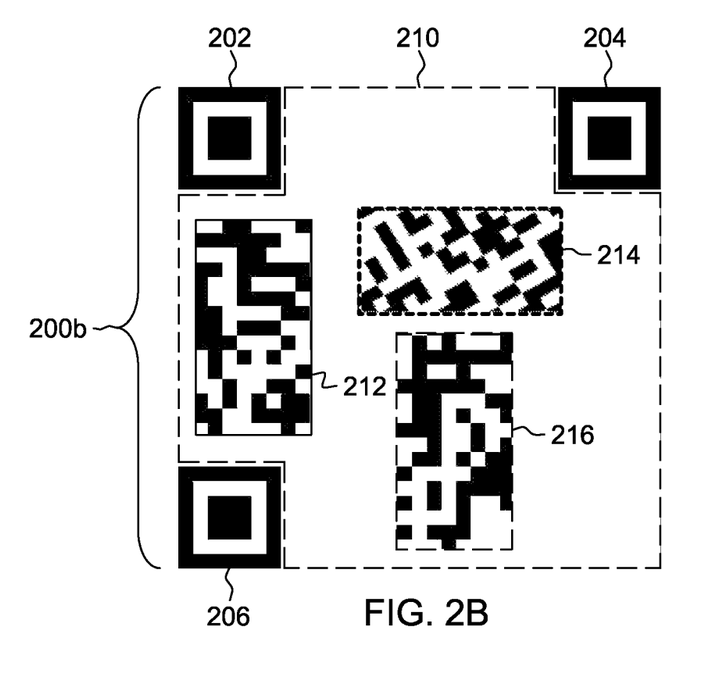
FIG. 2B depicts a matrix code including a data region partitioned by a mask technique and implementing a distortion technique in accordance with an embodiment of the present invention.

Referring now to FIG. 2B, matrix code 200b including data region 210 partitioned by a mask technique and implementing a distortion technique in accordance with an embodiment of the present invention is shown. In particular, matrix code 200b includes positioning symbol 202, positioning symbol 204, positioning symbol 206, and data region 210. Positioning symbols 202, 204, and 206 are used by matrix code scanners 131 and 141 to determine the position and orientation of matrix code 200b. Data region 210 primarily includes public or private user data, but it can also include additional symbols for use by matrix code scanners 131 and 141 to determine the position and orientation of matrix code 200b. For example, data region 210 can include additional symbols (not shown) such as alignment patterns, timing patterns, a format information region, and a version information region. In another embodiment, data region 210 can be extended to include positioning symbols 202, 204, and 206. Public and private user data within data region 210 is separated utilizing a masking technique. For example, as depicted in FIG. 2B, mask 212 includes public user data, mask 214 includes private user data distorted using a distortion technique, and mask 216 includes private user data.

In one embodiment, matrix code 200b including mask 212 that includes public user data can be generated by user device 120. As such, matrix code 200b including only mask 212 but not yet mask 214 or mask 216 can be regarded as a base matrix code, suitable as a foundation for generating another version of matrix code 200b that includes additional masks. In another embodiment, the base matrix code can be generated by a device other than user device 120, such as financial server 130 or retail server 140, and can be transmitted to user device 120 for later use. Subsequently, mask 214 including private user data distorted using a distortion technique can be generated by financial server 130, for addition to matrix code 200b. Further, mask 216 including private user data can be generated by retail server 140, for addition to matrix code 200b. In another embodiment, mask 214 can be generated by retail server 140, and then mask 216 can be generated by financial server 130. The locations of masks 212, 214, and 216 within data region 210 can be agreed to in advance by the provider of user program 122, the banking institution supported by financial server 130, and the retail establishment supported by retail server 140. Additionally, the locations of masks 212, 214, and 216 within data region 210 can be determined by a commercial or governmental standards body, for example. Although masks 212, 214, and 216 are depicted as rectangular regions in FIG. 2, other layouts and shapes for masks can be implemented. For example, in various embodiments masks can be any division, subsection, or fixed-length or variable-length segment within data region 210. In various embodiments, the portions of data region 210 not taken up by a mask can be filled with test-pattern data or padding data.

Figure 2C:
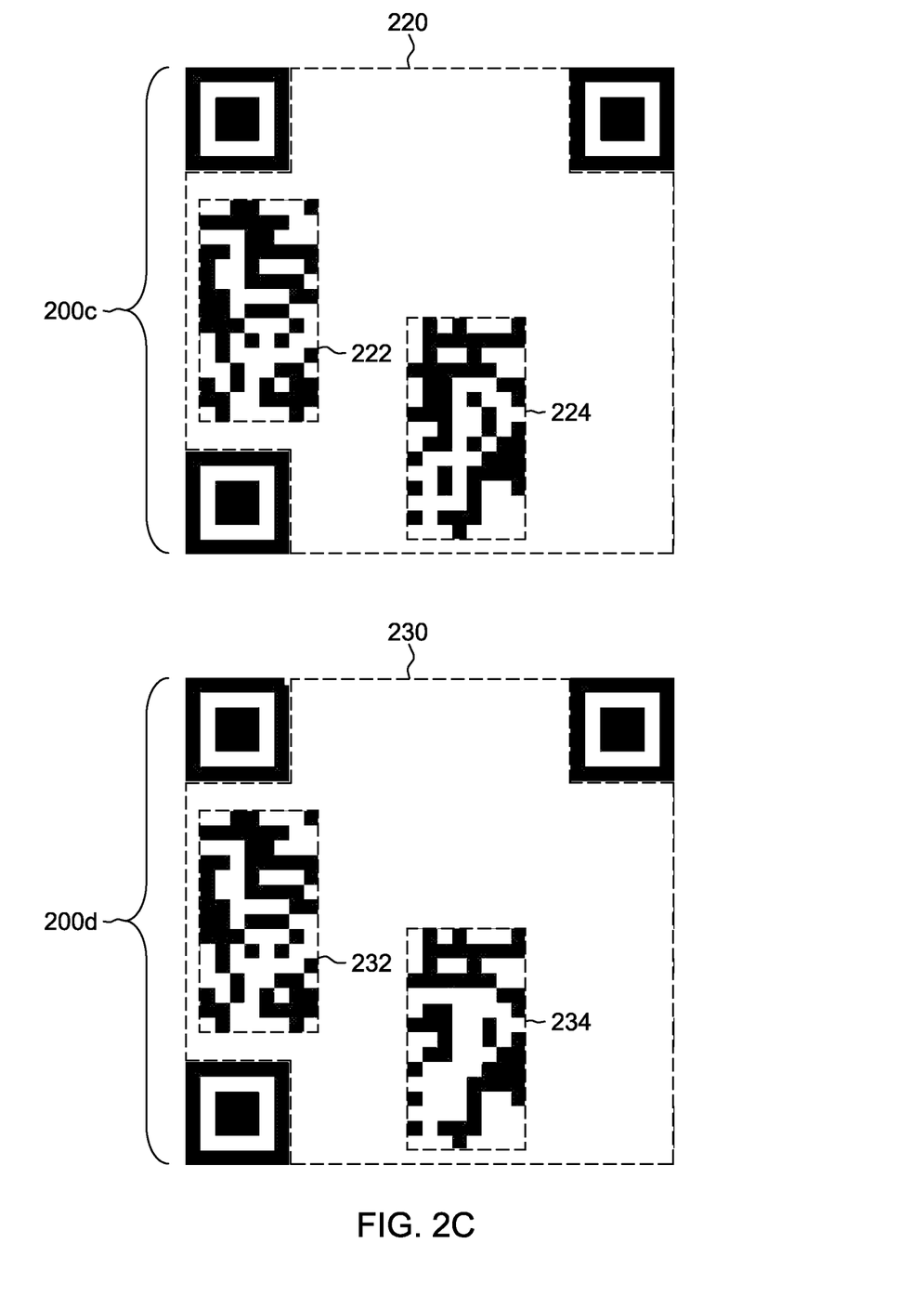
FIG. 2C depicts matrix codes including data regions partitioned by a mask technique in accordance with an embodiment of the present invention.

Referring now to FIG. 2C, matrix code 200c and matrix code 200d including data regions 220 and 230 partitioned by a mask technique in accordance with an embodiment of the present invention are shown. In particular, public and private user data within data regions 220 and 230 are separated utilizing a masking technique. Masks 222 and 232 include public user data, while masks 224 and 234 include private user data. Notably, while masks 222 and 232 include similar or identical public user data, masks 224 and 234 include different private user data. As such, matrix code 200c and matrix code 200d include a common base matrix code, analogous to matrix code 200b including only mask 212, as well as additional separate masks 224 and 234. Separate masks 224 and 234 can include private user data related to separate entities in similar fields, as determined by a commercial or governmental standards body. For example, in one embodiment mask 224 can include private user data related to the banking institution supported by financial server 130, while mask 234 can include private user data related to a different banking institution. In another embodiment, separate masks 224 and 234 could include private user data related to two different retail establishments, for example. Both matrix code 200c and matrix code 200d can be generated by and stored on user device 120, and each can be displayed at different times on display 121 depending on the intent of person 102. By generating and storing multiple layers of matrix codes in the described manner, the flexibility of the current technique is increased. This assures a consistent, common, and reusable dataset.

Figure 3:
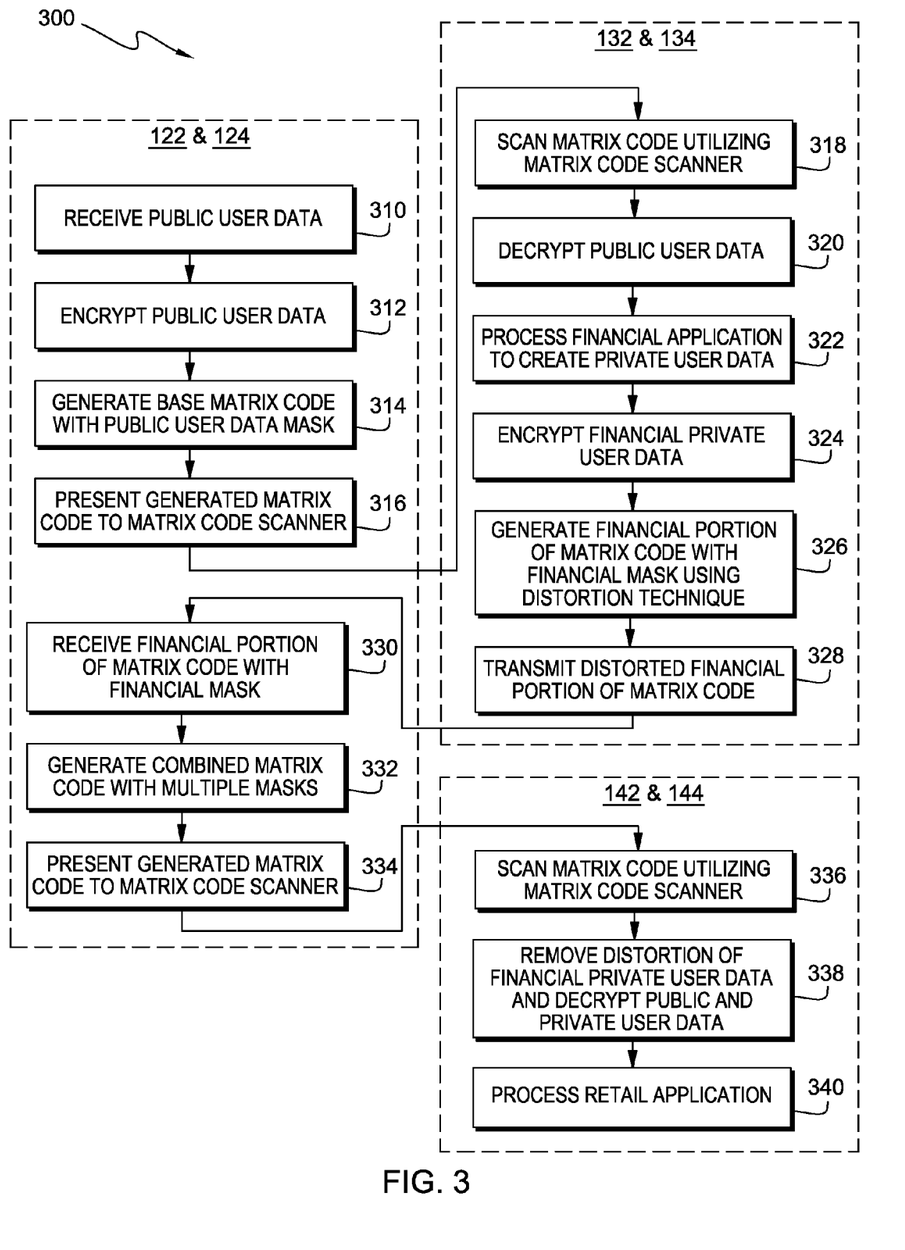
FIG. 3 depicts a flowchart illustrating steps followed by a user program, a financial program, a retail program, and associated matrix code programs, during the encryption, storage, and transmission of data in accordance with an embodiment of the present invention.

FIG. 3 depicts flowchart 300 illustrating steps followed by user program 122, financial program 132, retail program 142, and associated matrix code programs 124, 134, and 144, during the encryption, storage, and transmission of data in accordance with an embodiment of the present invention. As shown in FIG. 3, user program 122 and matrix code program 124 perform steps 310 through 316. Following this, financial program 132 and matrix code program 134 perform steps 318 through 328. Subsequently, user program 122 and matrix code program 124 perform steps 330 through 334. Finally, retail program 142 and matrix code program 144 perform steps 336 through 340. It should be understood that in various embodiments, the roles and order of operations can be changed or even reversed. For example, in one such embodiment, financial program 132 and matrix code program 134 can be utilized to decode and utilize the output of retail program 142 and matrix code program 144.

In step 310, user program 122 receives public user data. In particular, user program 122 can receive public user data from person 102, for example, who inputs the public user data utilizing a smart phone graphical user interface of user device 120. The public user data can include contact information for person 102. In step 312, the public user data can be encrypted by user program 122. Encryption algorithms can include, for example, PGP (Pretty Good Privacy) or RSA (Rivest, Shamir, and Adleman) algorithms. However, in another embodiment the public user data is not encrypted. In step 314, user program 122 can utilize matrix code program 124 to generate a base matrix code with a public user data mask. For example, matrix code 200b including mask 212 can be generated. In step 316, the generated matrix code is presented to a matrix code scanner. For example, matrix code 200b including mask 212 can be presented to matrix code scanner 131 of financial server 130, during a trip by person 102 to a bank to open a new banking account or to apply for a line of credit such as an auto loan.

In step 318, financial program 132 scans the presented matrix code. For example, matrix code 200b including mask 212 can be scanned using matrix code scanner 131, yielding public user data of person 102. In step 320, the scanned public user data can be decrypted, if it was encrypted in step 312. In one embodiment, during step 320 the scanned public user data can be decrypted after person 102 provides a decryption password to financial program 132 by entering it into a keyboard or a PIN (personal identification number) keypad in the bank, for example. Additionally, decryption can be authorized by a biometric scan such as a fingerprint scan. During step 322, financial program 132 processes a financial application. The financial application is the objective of the trip by person 102 to the bank. For example, processing the financial application can include opening a new banking account or applying for a line of credit utilizing the scanned public user data. Notably, providing the scanned public user data in this fashion streamlines the processing of the financial application, at least insofar as person 102 is not required to fill out laborious paper forms with his or her public user data. Further, in one embodiment, processing the financial application includes automatically filling out an electronic form utilizing the scanned public user data. After the financial application has finished processing, (e.g., after person 102 is approved for the loan), financial private user data is created by financial program 132. The financial private user data can include, for example, a new banking account number or an auto loan account number.

In step 324, the financial private user data is optionally encrypted, and in step 326, financial program 132 can utilize matrix code program 134 to generate mask 214 including the private user data distorted using a distortion technique. To do so, matrix code program 134 can initially generate mask 214 without a distortion, such that mask 214 is scannable in the same fashion as, for example, mask 212 of matrix code 200b. After generating mask 214, a distortion can be applied. Applying a distortion can include applying a graphical transformation, rotation, skew, shear, reflection, projection, or other graphical operation to the image within mask 214. The applied distortion is reversible, such that a distorted mask can have the applied distortion removed during a later scanning operation. Generally, the distortion prevents unintended revelation of the distorted user data to parties not able to reverse the applied distortion. In step 328, financial program 132 transmits mask 214 including the private user data distorted using a distortion technique back to user device 120. In one embodiment, this transmission is performed via network 110. In another embodiment, this transmission is performed by displaying mask 214 on a display (not shown in FIG. 1) at the bank coupled to financial server 130 to a camera (not shown in FIG. 1) of user device 120. Such a display-to-camera transmission of mask 214 can be understood as a reversal of the information flow between display 121 and matrix code scanner 131 during previous step 318.

In step 330, user program 122 receives mask 214 including the private user data distorted using a distortion technique (with the assistance of matrix code program 124 if a camera of user device 120 is used to scan mask 214). As such, person 102 has completed the objective of the trip to the bank, because he or she has thus received in user device 120 financial private user data identifying the new banking account or line of credit applied for during the financial application. In step 332, user program 122 utilizing matrix code program 124 can generate a combined matrix code with multiple masks. In particular, mask 214 is combined with mask 212 within data region 210 of matrix code 200b, yielding a version of matrix code 200b that includes both public and private user data. In another embodiment, generation of a combined matrix code with multiple masks can yield, for example, matrix code 200c or matrix code 200d. As such, multiple different combined matrix codes, or layers, can be generated, each including a different combination of public and private user data. In step 334, the generated matrix code is presented to a matrix code scanner. For example, matrix code 200b including mask 212 and mask 214 can be presented to matrix code scanner 141 of retail server 140, during a trip by person 102 to a retail establishment to utilize the auto loan approved previously at the bank.

In step 336, retail program 142 scans the presented matrix code. For example, matrix code 200b including mask 212 and mask 214 can be scanned using matrix code scanner 141, yielding public and private user data of person 102. In step 338, retail program 142 can remove the distortion applied during step 326, and the scanned public and private user data can also be decrypted if they were encrypted in step 312 and step 324. In one embodiment, during step 338 the distortion can be removed from the private user data and the public and private user data can be decrypted after person 102 provides a decryption password to retail program 142 by entering it into a keyboard or a PIN keypad in the retail establishment, for example. Additionally, removal of distortion, decryption, or both can be authorized by a biometric scan such as a fingerprint scan. During step 340, retail program 142 processes a retail application. The retail application is the objective of the trip by person 102 to the retail establishment. For example, processing the retail application can include purchasing an automobile using the auto loan applied for at the bank. Notably, providing the scanned public and private user data in this fashion streamlines the processing of the retail application. Further, in one embodiment, processing the financial application includes automatically filling out an electronic form utilizing the scanned public and private user data. After the retail application has finished processing, (e.g., after person 102 is approved to purchase the automobile), retail private user data can be created by retail program 142, which includes, for example, registration information for the automobile. Such registration information can be subsequently encoded in mask 216, utilizing the techniques discussed above.

Figure 4:
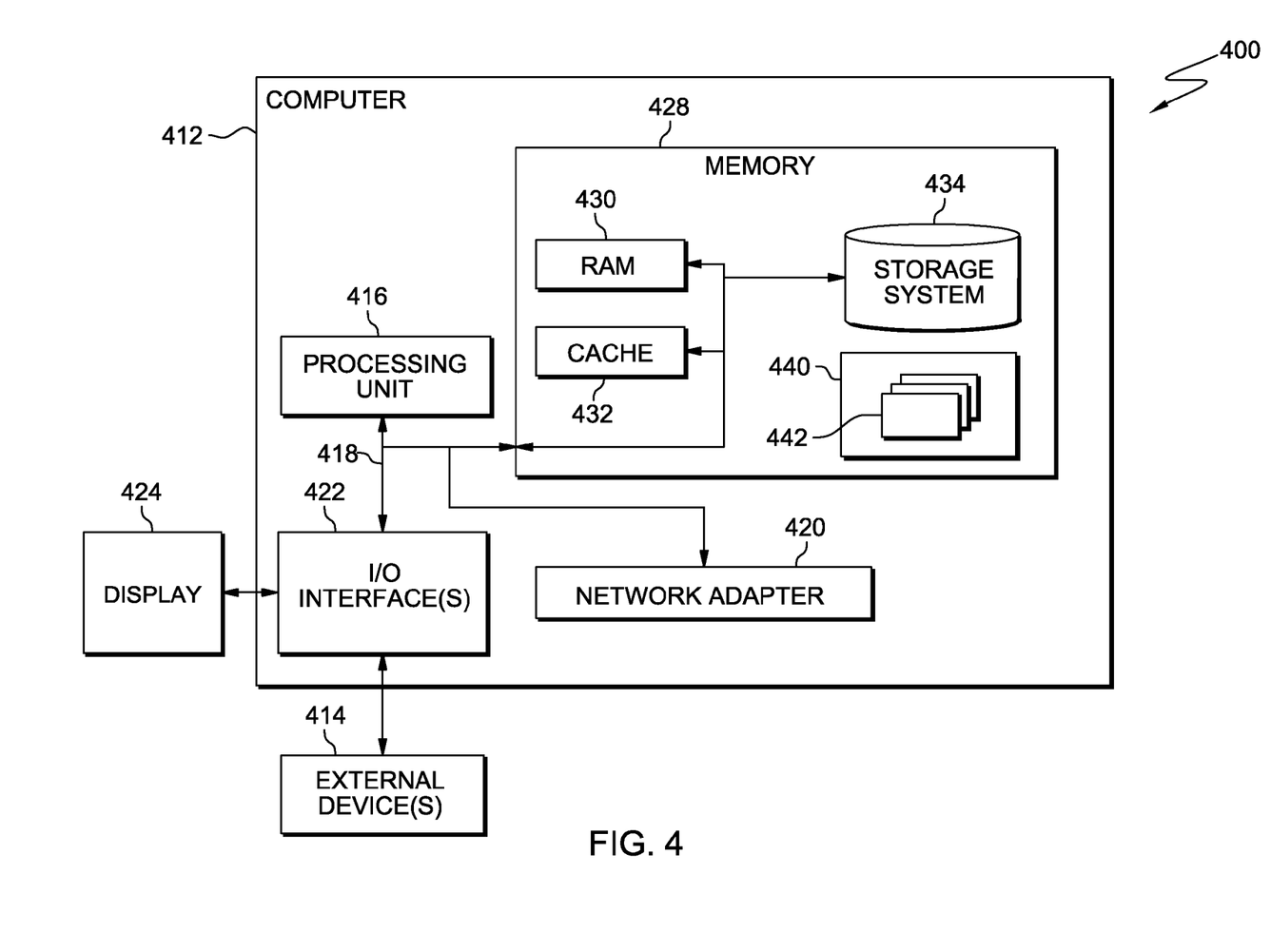
FIG. 4 is a functional block diagram of a computer system in accordance with an embodiment of the present invention.

Referring now to FIG. 4, a functional block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of user device 120, financial server 130, and retail server 140 can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Each one of user program 122, matrix code program 124, a financial program 132, matrix code program 134, retail program 142, and matrix code program 144 can be implemented as or can be an instance of program 440.

Computer 412 may also communicate with one or more external devices 414 such as a keyboard, a pointing device, etc., as well as display 424 which can correspond to display 121; one or more devices that enable a user to interact with computer 412; one or more matrix code scanners such as matrix code scanners 131 and 141; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412.

Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for utilizing matrix codes, the method comprising:
    receiving, by a computing device, public user data;
    generating, by the computing device, a display of a base matrix code for reading by a scanner associated with a first server, wherein the base matrix code includes the public user data in a first mask within a data region of the base matrix code;
    responsive to the display of the base matrix code to the scanner associated with the first server, receiving, by the computing device, first private user data from the first server; and
    generating, by the computing device, a display of a first combined matrix code for reading by a scanner associated with a second server, wherein the first combined matrix code includes the public user data in the first mask within a data region of the first combined matrix code and includes the first private user data in a second mask within the data region of the first combined matrix code.

2. The method of claim 1, wherein the receiving, by the computing device, the public user data includes receiving, by the computing device, the base matrix code.

3. The method of claim 1, wherein the receiving, by the computing device, the first private user data from the first server includes receiving, by the computing device, the first private user data via a network interface of the computing device.

4. The method of claim 1, wherein the receiving, by the computing device, the first private user data from the first server includes receiving, by the computing device, the first combined matrix code via a scanner of the computing device.

5. The method of claim 4, further comprising removing, by the computing device, a first transformation distortion operation from the second mask within the data region of the first combined matrix code.

6. The method of claim 1, wherein the first private user data includes a financial account number.

7. The method of claim 1, further comprising encrypting, by the computing device, the public user data displayed in the base matrix code.

8. The method of claim 1, further comprising encrypting, by the computing device, the first private user data displayed in the first combined matrix code.

9. The method of claim 1, further comprising:
    generating, by the computing device, a display of the base matrix code for reading by a scanner associated with a third server;
    responsive to the display of the base matrix code to the scanner associated with the third server, receiving, by the computing device, second private user data from the third server; and
    generating, by the computing device, a display of a second combined matrix code for reading by a scanner associated with a fourth server, wherein the second combined matrix code includes the public user data in the first mask within a data region of the second combined matrix code and includes the second private user data in the second mask within the data region of the second combined matrix code.

10. The method of claim 9, wherein the first server is associated with a first financial institution and the third server is associated with a second financial institution.

11. A computer program product for utilizing matrix codes, the computer program product comprising:
    one or more computer-readable tangible storage devices and program instructions stored on at least one of the one or more storage devices, the program instructions comprising:
    program instructions to receive public user data;
    program instructions to generate a display of a base matrix code for reading by a scanner associated with a first server, wherein the base matrix code includes the public user data in a first mask within a data region of the base matrix code;
    program instructions to receive, responsive to the display of the base matrix code to the scanner associated with the first server, first private user data from the first server; and
    program instructions to generate a display of a first combined matrix code for reading by a scanner associated with a second server, wherein the first combined matrix code includes the public user data in the first mask within a data region of the first combined matrix code and includes the first private user data in a second mask within the data region of the first combined matrix code.

12. The computer program product of claim 11, wherein receiving the public user data includes receiving the base matrix code.

13. The computer program product of claim 11, wherein receiving the first private user data from the first server includes receiving the first private user data via a network interface.

14. The computer program product of claim 11, wherein receiving the first private user data from the first server includes receiving the first combined matrix code via a scanner.

15. The computer program product of claim 14, further comprising program instructions to remove a first transformation distortion operation from the second mask within the data region of the first combined matrix code.

16. The computer program product of claim 11, wherein the first private user data includes a financial account number.

17. The computer program product of claim 11, further comprising program instructions to encrypt the public user data displayed in the base matrix code.

18. The computer program product of claim 11, further comprising program instructions to encrypt the first private user data displayed in the first combined matrix code.

19. The computer program product of claim 11, further comprising:
   program instructions to generate a display of the base matrix code for reading by a scanner associated with a third server;
   program instructions to receive, responsive to the display of the base matrix code to the scanner associated with the third server, second private user data from the third server; and
   program instructions to generate a display of a second combined matrix code for reading by a scanner associated with a fourth server, wherein the second combined matrix code includes the public user data in the first mask within a data region of the second combined matrix code and includes the second private user data in the second mask within the data region of the second combined matrix code.

20. The computer program product of claim 19, wherein the first server is associated with a first financial institution and the third server is associated with a second financial institution.

* * * * *